US008906148B2

(12) United States Patent
Liu

(10) Patent No.: US 8,906,148 B2
(45) Date of Patent: Dec. 9, 2014

(54) BUBBLE GENERATOR FOR VALVE OR FAUCET

(71) Applicant: Shih Tang Liu, Changhua (TW)

(72) Inventor: Shih Tang Liu, Changhua (TW)

( * ) Notice: Subject to any disclaimer, the term of this patent is extended or adjusted under 35 U.S.C. 154(b) by 189 days.

(21) Appl. No.: 13/633,909

(22) Filed: Oct. 3, 2012

(65) Prior Publication Data

US 2014/0091484 A1 Apr. 3, 2014

(30) Foreign Application Priority Data

Apr. 13, 2012 (TW) ............................ 101206925 A

(51) Int. Cl.
*B01D 19/00* (2006.01)

(52) U.S. Cl.
USPC ............................................... 96/204; 96/206

(58) Field of Classification Search
CPC ..... B01D 19/00; B01D 19/0042; F16K 31/00
USPC .................. 96/155, 204, 206, 208, 214, 216; 251/339; 239/428.5
See application file for complete search history.

(56) References Cited

U.S. PATENT DOCUMENTS 6,655,664 B2 12/2003 Chuang

FOREIGN PATENT DOCUMENTS

JP 2005205326 A * 8/2005

* cited by examiner

*Primary Examiner* — Robert A Hopkins
(74) *Attorney, Agent, or Firm* — Charles E. Baxley

(57) ABSTRACT

A bubble generator includes a housing engaged in a receptacle, and a casing engaged into the housing and having an outer peripheral fence and a bottom plate, and having a bulge extended upwardly from the bottom plate for forming an inner peripheral channel between the bulge and the peripheral fence, and having a passage formed in the peripheral fence and communicating with the inner peripheral channel of the casing for allowing a fluid to flow into the inner peripheral channel of the casing and to flow out through the passage of the casing and to flow into the compartment of the housing, and the casing includes a number of projections extended from the bulge for agitating the fluid and for generating air bubbles in the fluid.

11 Claims, 3 Drawing Sheets

BUBBLE GENERATOR FOR VALVE OR FAUCET

BACKGROUND OF THE INVENTION

1. Field of the Invention

The present invention relates to a bubble generator, and more particularly to a bubble generator including a structure for attaching or mounting to a faucet or valve or the like and for suitably and effectively generating air bubbles in the water that flowing out through the faucet or valve.

2. Description of the Prior Art

Typical bubble generators have been developed and provided for attaching or mounting to a faucet or valve or the like and normally comprise a faucet housing or container or receptacle for attaching or mounting to the faucet or valve or the like, and a serrated or rough or uneven structure formed or provided in the faucet housing for agitating the water that flowing out through the faucet or valve and for generating air bubbles in the water.

For example, U.S. Pat. No. 6,655,664 to Chuang discloses one of the typical bubble generators comprising a cylindrical casing, a tapered tube suspended in a front open side of the casing and adapted for guiding water into the casing, the tapered tube includes recessed holes on the inside adapted for causing a negative pressure when water passing through the tapered tube into the inside of the casing toward the water outlet, a rod member is axially and slidably inserted through a rear closed side of the casing into the inside of the tapered tube, and a stopper is fixedly fastened to the rod member and moved with the rod member to adjust the gap between the stopper and the tapered tube.

However, the water may not evenly flow through the typical bubble generator when the tapered tube is disposed and supported in a lateral structure, and thus may not be used to suitably and effectively generate air bubbles in the water that flowing out through the faucet or valve.

The present invention has arisen to mitigate and/or obviate the afore-described disadvantages of the conventional bubble generators.

SUMMARY OF THE INVENTION

The primary objective of the present invention is to provide a bubble generator including a structure for attaching or mounting to a faucet or valve or the like and for suitably and effectively generating air bubbles in the water that flowing out through the faucet or valve.

In accordance with one aspect of the invention, there is provided a bubble generator comprising a receptacle including a chamber formed therein, a housing engaged in the chamber of the receptacle, and including a compartment formed therein and defined by an outer peripheral wall, and a casing engaged into the compartment of the housing, and including an outer peripheral fence and a bottom plate, and including a bulge extended upwardly from the bottom plate of the casing for forming an inner peripheral channel between the bulge and the outer peripheral fence, and including a passage formed in the outer peripheral fence and communicating with the inner peripheral channel of the casing for allowing a fluid to flow into the inner peripheral channel of the casing and to flow out through the passage of the casing and to flow into the compartment of the housing, and the casing including a number of projections extended from the bulge and arranged around the bulge for agitating the fluid and for generating air bubbles in the fluid before the fluid is flowing out of the housing and the receptacle.

The outer peripheral fence of the casing includes a diameter smaller than that of the outer peripheral wall of the housing for forming an annular pathway between the housing and the casing, and the annular pathway is communicating with the passage of the casing for receiving the fluid after the fluid is flowing out through the passage of the casing.

The housing includes an inner peripheral shoulder formed therein, and the casing includes an outer peripheral rib extended radially and outwardly from outer peripheral fence for fitting or engaging with the inner peripheral shoulder of the housing and for stably anchoring and positioning the casing in the compartment of the housing.

The casing includes a recess formed in the bottom portion thereof. The housing includes a bottom wall having a number of openings formed in the bottom wall and communicating with the compartment of the housing for allowing the fluid to flow through the openings of the bottom wall of the housing before flowing out of the housing.

The housing includes a protrusion extended upwardly from the bottom wall and having a cavity formed in the protrusion of the housing. The casing includes a stem extended downwardly therefrom and engaged into the cavity of the protrusion of the housing for circulating or agitating the fluid and for further generating the air bubbles in the water or fluid.

The receptacle includes an inner peripheral shoulder formed therein, and the housing includes an outer peripheral flange extended radially and outwardly therefrom for engaging with the inner peripheral shoulder of the receptacle and for stably or solidly anchoring and positioning the housing in the chamber of the receptacle.

A controlling device may further be provided and includes a board engaging onto the casing, and the board includes an orifice formed therein for limiting the fluid to flow into the casing. The casing includes an upper depression formed therein for receiving and engaging with the board and for stably or solidly anchoring and positioning the board within the upper depression of the casing.

A filter device may further be provided and includes a peripheral frame contacted and engaged with the housing and the casing for anchoring the housing and the casing within the receptacle, and includes a net member engaged into the peripheral frame for filtering the fluid and for preventing the dirt or particles from entering into the casing and the housing.

A washer may further be provided and engaged into the chamber of the receptacle and contacted and engaged with the peripheral frame of the filter device for securing the filter device and the housing and the casing within the receptacle.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figure 1:
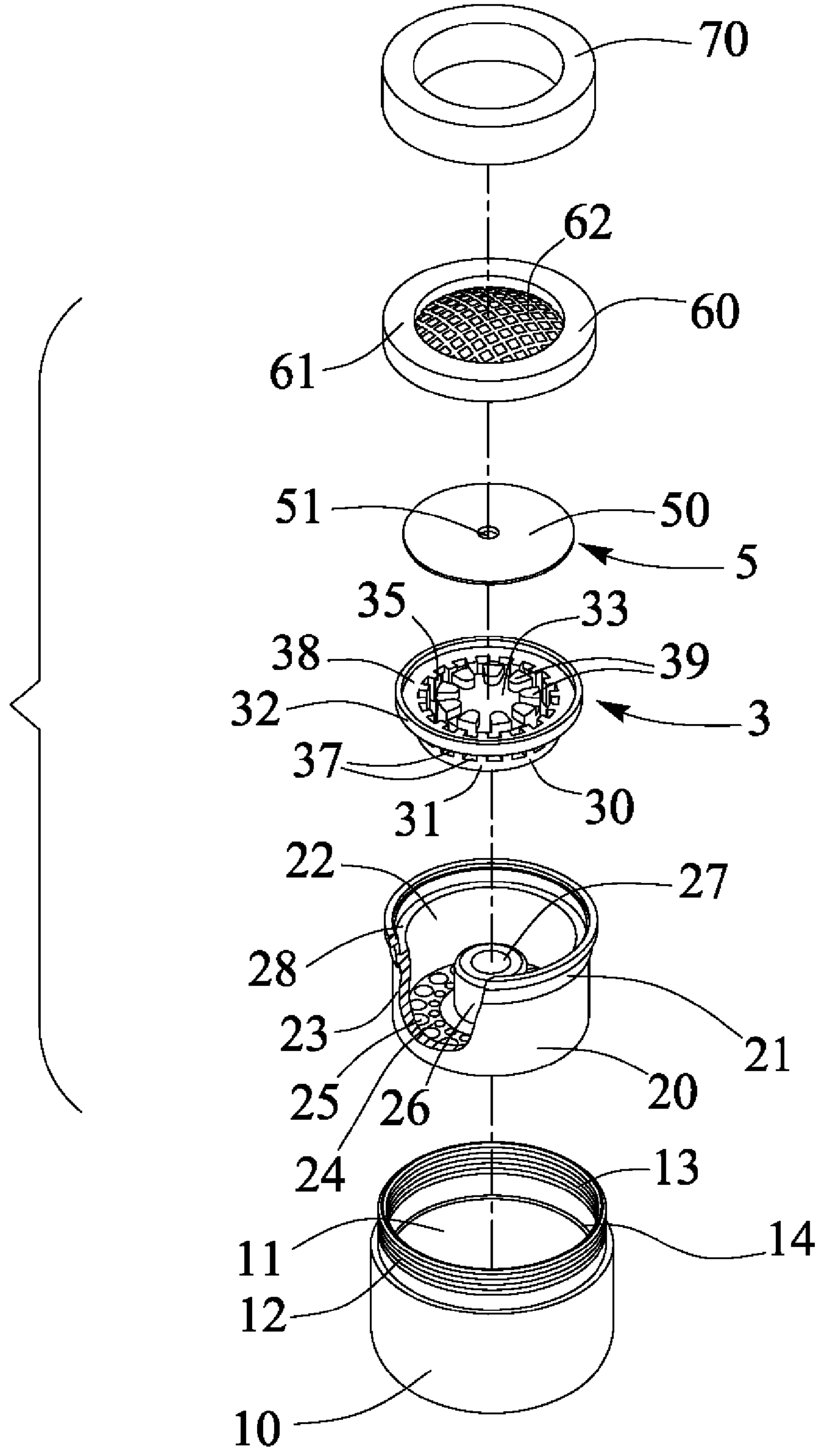
FIG. 1 is an exploded view of a bubble generator in accordance with the present invention.
Figure 2:
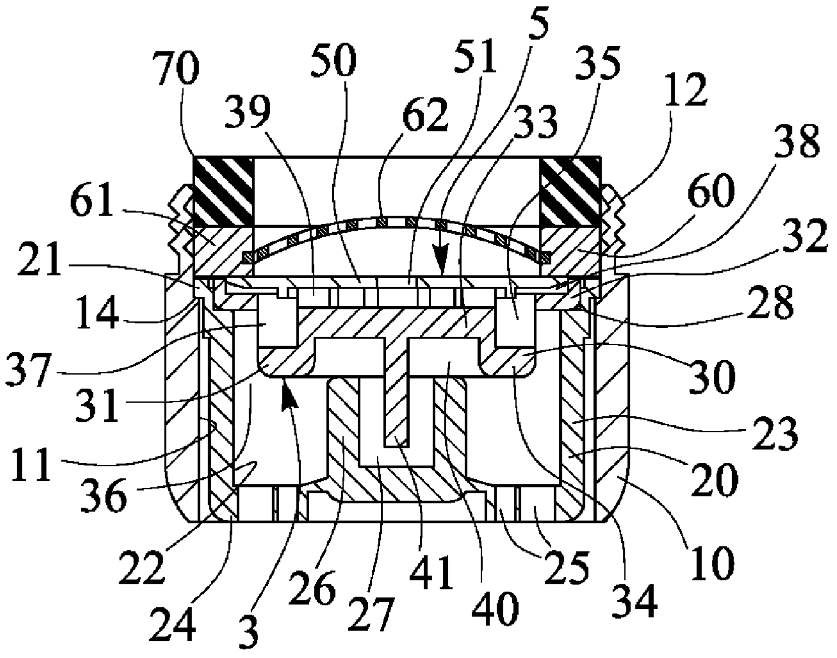
FIG. 2 is a cross sectional view of the bubble generator.

Referring to the drawings, and initially to FIGS. 1 and 2, a bubble generator in accordance with the present invention comprises an outer container or sleeve or barrel or tubular or cylindrical housing or receptacle 10 including a through hole or space or chamber 11 formed therein, and including an outer thread 12 and/or an inner thread 13 formed or provided therein for attaching or mounting or securing or coupling to the faucet or valve (not shown) or the like, and including an inner peripheral shoulder 14 formed or provided therein. An inner container or housing 20 is disposed or received or engaged in the chamber 11 of the cylindrical receptacle 10, and includes an outer peripheral rib or flange 21 extended radially and outwardly therefrom for engaging with the inner peripheral shoulder 14 of the receptacle 10 and for solidly and stably anchoring or retaining or positioning the housing 20 in the chamber 11 of the receptacle 10.

The housing 20 further includes a chamber or space or compartment 22 formed therein and formed or defined by an outer peripheral wall 23 and a bottom wall 24, and includes a number of holes or openings 25 formed in the bottom wall 24 thereof and communicating with the compartment 22 of the housing 20 for allowing the fluid or water to flow out through the compartment 22 and the openings 25 of the housing 20, and includes a stud or bulge or projection or swelling or shank or protrusion 26 extended upwardly from the center portion of the bottom wall 23 and having a space or cavity 27 formed in the protrusion 26 for receiving the fluid or water and for circulating the fluid or water, and includes an inner peripheral shoulder 28 formed or provided therein and located above the protrusion 26, it is preferable that the protrusion 26 is shorter or lower than the outer peripheral wall 23 and the inner peripheral shoulder 28 of the housing 20.

A distributing or agitating device 3 includes a casing 30 disposed or engaged into the compartment 22 of the housing 20, and the casing 30 includes an outer peripheral fence 31 having an outer peripheral flange or rib 32 extended radially and outwardly therefrom for engaging with the inner peripheral shoulder 28 of the housing 20 and for solidly and stably anchoring or retaining or positioning the casing 30 in the compartment 22 of the housing 20, and includes a platform or projection or swelling or bulge 33 extended upwardly from the center portion of a bottom plate 34 of the casing 30 for forming or defining an annular or inner peripheral chamber or compartment or channel 35 between the bulge 33 and the outer peripheral fence 31, and the outer peripheral fence 31 of the casing 30 includes a size or outer diameter smaller than that of the outer peripheral wall 23 of the housing 20 for forming or defining an annular pathway 36 between the housing 20 and the casing 30.

The casing 30 includes a number of holes or passages 37 formed in the outer peripheral fence 31 and communicating with the inner peripheral channel 35 of the casing 30 and also communicating with the annular pathway 36 that is formed or defined between the housing 20 and the casing 30 for allowing the fluid or water to flow into the inner peripheral channel 35 of the casing 30 and to flow out through the passages 37 of the casing 30 and then to flow into the annular pathway 36 and the compartment 22 of the housing 20, the casing 30 further includes a recess or depression 38 formed in the upper portion thereof, such as formed in the outer peripheral rib 32 and communicating with the inner peripheral channel 35 of the casing 30, and further includes a number of keys or swellings or studs or projections 39 extended upwardly from the bulge 33 and arranged around the bulge 33 and/or arranged in the inner peripheral portion of the annular channel 35 of the casing 30, for agitating the water (FIGS. 3, 4) and for generating air bubbles in the water when the water is flowing into the casing 30.

It is preferable, but not necessary that the casing 30 includes a depression or recess 40 formed in the bottom portion thereof (FIGS. 2-4), and includes a shank or shaft or rod or stem 41 extended downwardly therefrom and extended or engaged into the cavity 27 of the protrusion 26 of the housing 20 for circulating or agitating the fluid or water and for further generating the air bubbles in the water. The bubble generator further includes a guiding or limiting or controlling device 5 having a board 50 which includes a circular and planar shaped structure for fitting or engaging into the depression 38 of the casing 30, and the board 50 includes an orifice 51 formed therein, such as formed in the center portion of the board 50 for guiding or limiting or controlling the fluid or water to flow into the casing 30 (FIG. 4). The bubble generator may further include one or more other boards (not shown) having the orifices of different inner diameters for limiting or controlling the flowing quantity and/or the flowing speed of the fluid or water.

A filter device 60 may further be provided and disposed or engaged into the chamber 11 of the receptacle 10 and includes an annular or peripheral frame 61 contacted and engaged onto or engaged with the housing 20 and the casing 30 (FIG. 2) for solidly and stably anchoring or retaining or securing the housing 20 and the casing 30 within the receptacle 10, and includes a net member 62 provided and disposed or engaged into the peripheral frame 61 and preferably located above the board 50 for filtering the fluid or water and for preventing the dirt or particles or other contaminants from entering into the casing 30 and the housing 20, and a gasket or washer 70 may further be provided and disposed or engaged into the chamber 11 of the receptacle 10 and contacted and engaged onto or engaged with the peripheral frame 61 of the filter device 60 for solidly and stably anchoring or retaining or securing the filter device 60, and thus the housing 20 and the casing 30 within the receptacle 10.

Figure 3:
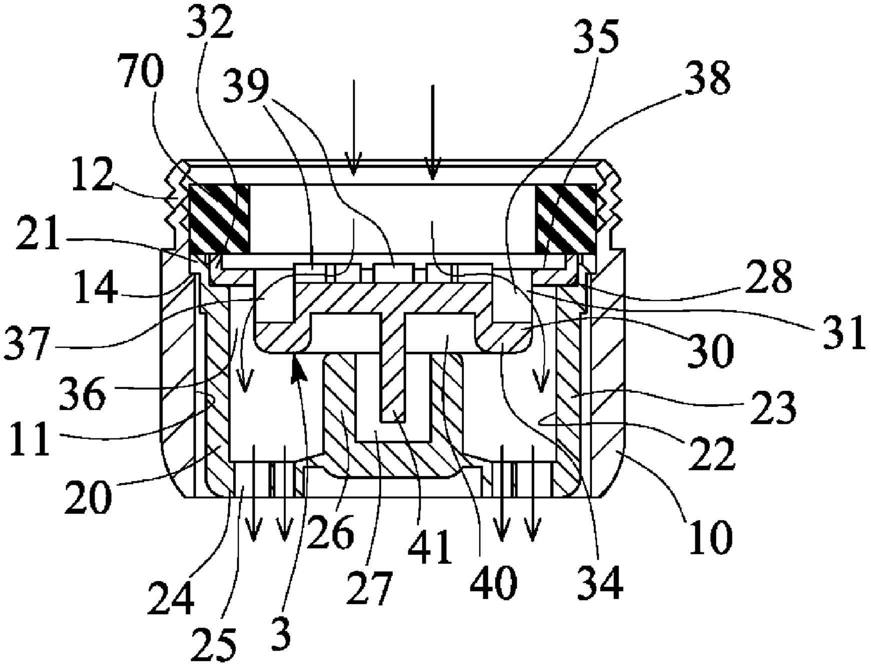
FIGS. 3 and 4 are cross sectional views similar to FIG. 2, illustrating the operation of the bubble generator.
Figure 4:
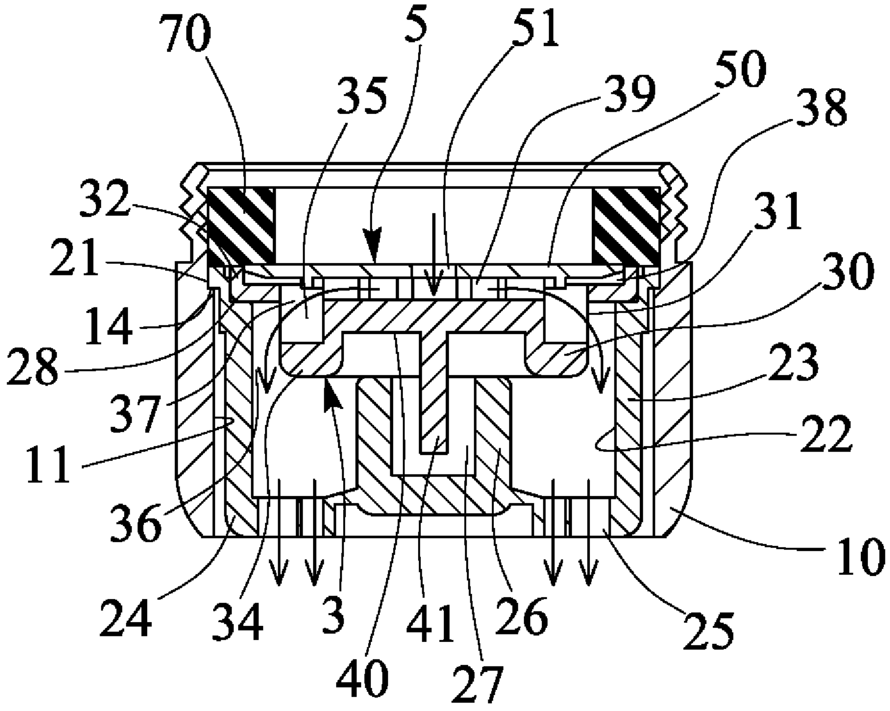

In operation, as shown in FIG. 3, when the filter device 60 and the board 50 are removed or disengaged or separated from the receptacle 10 and the housing 20, the gasket or washer 70 may be fitted or engaged into the chamber 11 of the receptacle 10 and directly contacted and engaged onto or engaged with the housing 20 and the casing 30, and the receptacle 10 may then be attach or mounted or secured or coupled to the faucet or valve (not shown) or the like for allowing the fluid or water to flow into the receptacle 10 and to flow through the gasket or washer 70, and then to flow into the casing 30 and the housing 20, the fluid or water may first flow toward or onto the bulge 33 of the casing 30 and/or flow into the inner peripheral channel 35 of the casing 30, and then to flow through the passages 37 of the casing 30 and to flow into the annular pathway 36 and the compartment 22 of the housing 20, and then to flow out through the openings 25 of the housing 20, the air bubbles may be generated when the fluid or water is flowing through the projections 39 and/or the passages 37 of the casing 30 and/or the openings 25 of the housing 20.

As shown in FIG. 4, when the filter device 60 is selectively removed or disengaged or separated from the receptacle 10 and the housing 20 and the casing 30, but the board 50 is fitted or engaged into the depression 38 of the casing 30, the fluid or water is guided or limited or controlled to flow into and through the orifice 51 of the board 50, and then to flow into the casing 30 and the housing 20, at this moment, the fluid or water is guided or limited and forced to flow through the projections 39 of the casing 30 so as to be agitated by the projections 39 in order to suitably generate the air bubbles. The other boards (not shown) having the orifices of different inner diameters may be replaced and selectively fitted or engaged into the depression 38 of the casing 30 for adjusting and limiting or controlling the flowing quantity and/or the flowing speed of the fluid or water through the boards 50.

As shown in FIG. 2, when the filter device 60 and the board 50 are both fitted or engaged into the receptacle 10, and the peripheral frame 61 of the filter device 60 is contacted and engaged onto or engaged with the housing 20 and the casing 30 and the board 50, the net member 62 of the filter device 60 may be provided for filtering the fluid or water and for preventing the dirt or particles or other contaminants from entering into the casing 30 and the housing 20, and the net member 62 of the filter device 60 may also be used to selectively agitate the fluid or water in order to further generate the air bubbles. The provision and/or the formation of the projections 39 that are extended upwardly from the bulge 33 and arranged around the bulge 33 and/or arranged in the inner peripheral portion of the inner peripheral channel 35 of the casing 30 may be suitably and excellently used to force the water to flow bypass or through the projections 39 of the casing 30 so as to agitate the water in order to suitably generate the air bubbles.

Accordingly, the bubble generator includes a structure for attaching or mounting to a faucet or valve or the like and for suitably and effectively generating the air bubbles in the water that flowing out through the faucet or valve.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A bubble generator comprising:

a receptacle including a chamber formed therein, a housing engaged in said chamber of said receptacle, and including a compartment formed therein and defined by an outer peripheral wall, and a casing engaged into said compartment of said housing, and including an outer peripheral fence and a bottom plate, and including a bulge extended upwardly from said bottom plate of said casing for forming an inner peripheral channel between said bulge and said outer peripheral fence, and including a passage formed in said outer peripheral fence and communicating with said inner peripheral channel of said casing for allowing a fluid to flow into said inner peripheral channel of said casing and to flow out through said passage of said casing and to flow into said compartment of said housing, and said casing including a plurality of projections extended from said bulge and arranged around said bulge for agitating the fluid and for generating air bubbles in the fluid and said casing including a recess formed in bottom thereof.

2. The bubble generator as claimed in claim 1, wherein said outer peripheral fence of said casing includes a diameter smaller than that of said outer peripheral wall of said housing for forming an annular pathway between said housing and said casing, and said annular pathway is communicating with said passage of said casing.

3. The bubble generator as claimed in claim 1, wherein said housing includes an inner peripheral shoulder formed therein, and said casing includes an outer peripheral rib extended radially and outwardly from outer peripheral fence for engaging with said inner peripheral shoulder of said housing and for anchoring said casing in said compartment of said housing.

4. The bubble generator as claimed in claim 1, wherein said housing includes a bottom wall having a plurality of openings formed in said bottom wall and communicating with said compartment of said housing.

5. The bubble generator as claimed in claim 1, wherein said receptacle includes an inner peripheral shoulder formed therein, and said housing includes an outer peripheral flange extended radially and outwardly therefrom for engaging with said inner peripheral shoulder of said receptacle and for positioning said housing in said chamber of said receptacle.

6. A bubble generator comprising:

a receptacle including a chamber formed therein, a housing engaged in said chamber of said receptacle, and including a compartment formed therein and defined by an outer peripheral wall, said housing including a bottom wall having a plurality of openings formed in said bottom wall and communicating with said compartment of said housing, said housing including a protrusion extended upwardly from said bottom wall and having a cavity formed in said protrusion of said housing, and a casing engaged into said compartment of said housing, and including an outer peripheral fence and a bottom plate, and including a bulge extended upwardly from said bottom plate of said casing for forming an inner peripheral channel between said bulge and said outer peripheral fence, and including a passage formed in said outer peripheral fence and communicating with said inner peripheral channel of said casing for allowing a fluid to flow into said inner peripheral channel of said casing and to flow out through said passage of said casing and to flow into said compartment of said housing, and said casing including a plurality of projections extended from said bulge and arranged around said bulge for agitating the fluid and for generating air bubbles in the fluid.

7. The bubble generator as claimed in claim 6, wherein said casing includes a stem extended downwardly therefrom and engaged into said cavity of said protrusion of said housing.

8. A bubble generator comprising:

a receptacle including a chamber formed therein, a housing engaged in said chamber of said receptacle, and including a compartment formed therein and defined by an outer peripheral wall, a casing engaged into said compartment of said housing, and including an outer peripheral fence and a bottom plate, and including a bulge extended upwardly from said bottom plate of said casing for forming an inner peripheral channel between said bulge and said outer peripheral fence, and including a passage formed in said outer peripheral fence and communicating with said inner peripheral channel of said casing for allowing a fluid to flow into said inner peripheral channel of said casing and to flow out through said passage of said casing and to flow into said compartment of said housing, and said casing including a plurality of projections extended from said bulge and arranged around said bulge for agitating the fluid and for generating air bubbles in the fluid, and a controlling device including a board engaging onto said casing, and said board includes an orifice formed therein for guiding the fluid to flow into said casing.

9. The bubble generator as claimed in claim 8, wherein said casing includes an upper depression formed therein for receiving and engaging with said board.

10. A bubble generator comprising:

a receptacle including a chamber formed therein, a housing engaged in said chamber of said receptacle, and including a compartment formed therein and defined by an outer peripheral wall, a casing engaged into said compartment of said housing, and including an outer peripheral fence and a bottom plate, and including a bulge extended upwardly from said bottom plate of said casing for forming an inner peripheral channel between said bulge and said outer peripheral fence, and including a passage formed in said outer peripheral fence and communicating with said inner peripheral channel of said casing for allowing a fluid to flow into said inner peripheral channel of said casing and to flow out through said passage of said casing and to flow into said compartment of said housing, and said casing including a plurality of projections extended from said bulge and arranged around said bulge for agitating the fluid and for generating air bubbles in the fluid, and a filter device including a peripheral frame contacted and engaged with said housing and said casing for anchoring said housing and said casing within said receptacle, and including a net member engaged into said peripheral frame for filtering the fluid.

11. The bubble generator as claimed in claim 10 further comprising a washer engaged into said chamber of said receptacle and contacted and engaged with said peripheral frame of said filter device for securing said filter device and said housing and said casing within said receptacle.

* * * * *